J. V. EDWARDS.
PLOW.
APPLICATION FILED JULY 22, 1913.
1,097,920.
Patented May 26, 1914.
2 SHEETS—SHEET 1.
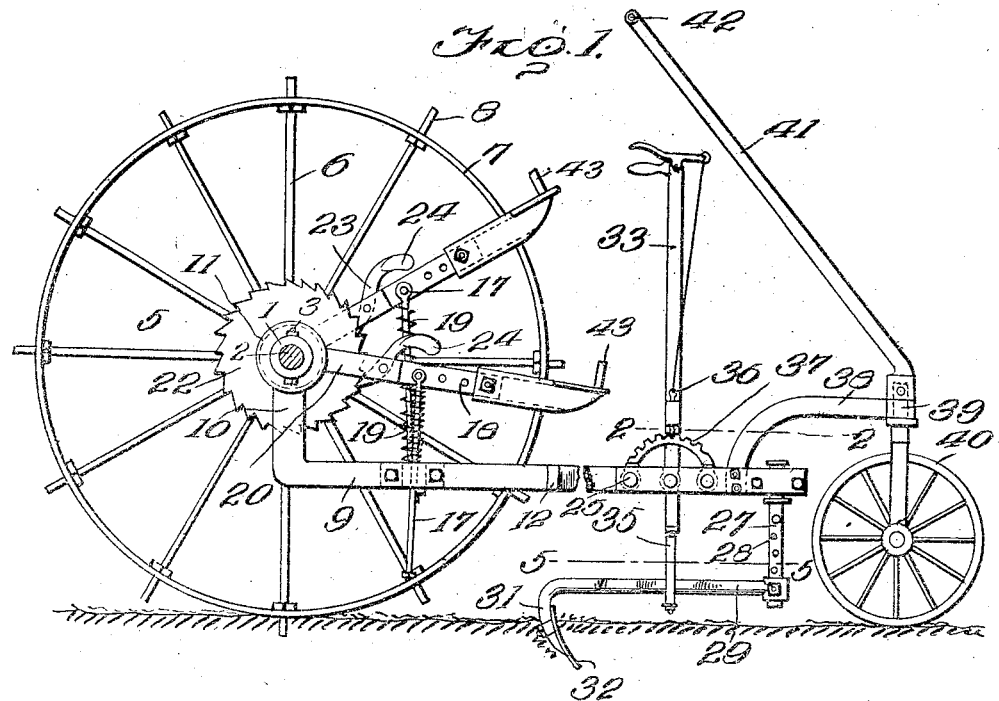
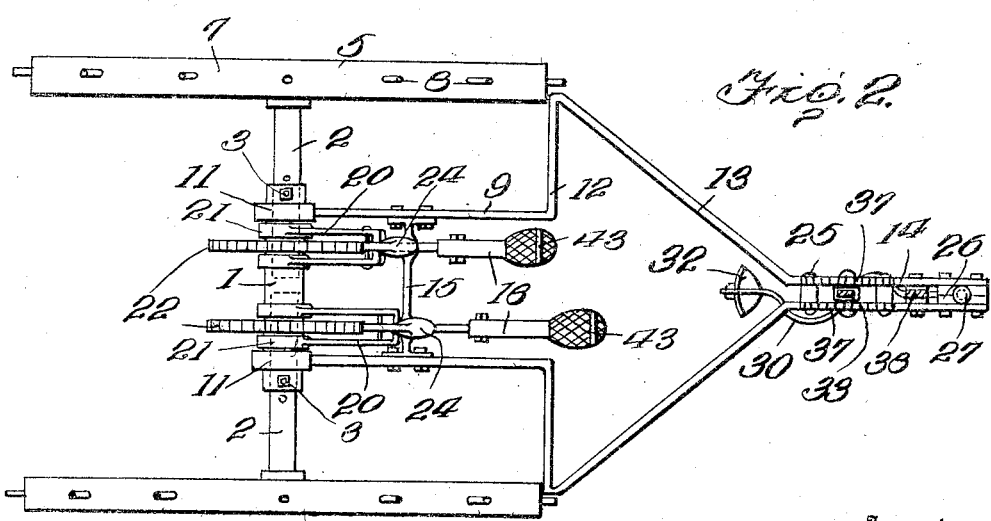
Witnesses
Inventor
Jessie V. Edwards.
By
Attorney.

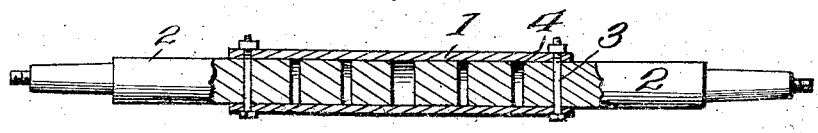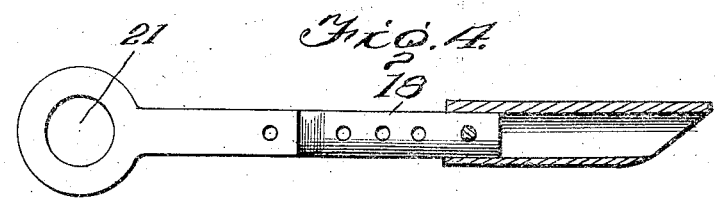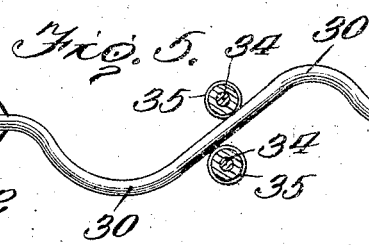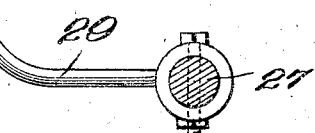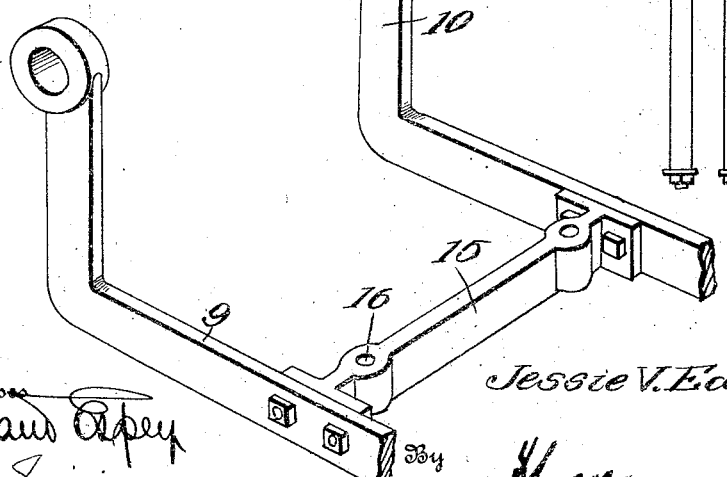

UNITED STATES PATENT OFFICE.

JESSIE V. EDWARDS, OF BEEVILLE, TEXAS.

PLOW.

1,097,920.   Specification of Letters Patent.   Patented May 26, 1914.

Application filed July 22, 1913. Serial No. 780,517.

*To all whom it may concern:*

Be it known that I, JESSIE V. EDWARDS, citizen of the United States, residing at Beeville, in the county of Bee and State of Texas, have invented certain new and useful Improvements in Plows, of which the following is a specification.

This invention relates to plows and has for its object the provision of a riding plow which may be actuated by the operator without the necessity of employing draft horses or a mechanical motor mounted upon or connected with the plow frame.

A further object of the invention is to provide novel means for guiding the plow so that the furrow formed will be straight notwithstanding any lateral shifting of the plow supporting frame when traveling over irregularities in the surface of the ground.

A further object of the invention is to provide means to prevent vines and bushes being caught in between the plow frame and the ground wheels.

The invention is illustrated in the accompanying drawings and will be hereinafter fully described, its novel features being subsequently more particularly pointed out in the claims following the description.

In the annexed drawings, which fully illustrate my invention, Figure 1 is a side elevation, with one ground wheel removed and parts in section, of a plow embodying my improvements; Fig. 2 is a view showing the rear portion of the plow in plan view and the front portion in horizontal section, the section being taken substantially on the line 2—2 of Fig. 1; Fig. 3 is a detail view of the axle; Fig. 4 is a detail view of one of the pedal bars; Fig. 5 is a horizontal section on the line 5—5 of Fig. 1; Fig. 6 is a detail view of a portion of the plow guiding mechanism; Fig. 7 is a detail perspective view of a portion of the frame.

In carrying out my invention, I employ an axle consisting of a central sleeve or hollow member 1, and solid end portions 2 which are fitted within the central sleeve and are adjustably secured therein by bolts 3 inserted through openings 4 in the end members and suitable perforations formed in the central member at the ends thereof. It will thus be seen that the axle may be extended or retracted so as to accommodate rows of various widths in the use of the machine. Secured to the ends of the end members 2 are ground wheels 5 which have their spokes 6 extended through the rims or fellies 7 so as to provide radial projections 8 which are adapted to take into the ground as the axle and wheels are rotated so as to produce the traction necessary to propel the plow. Hung upon the central sleeve or member of the axle is the main frame 9 consisting of two similar portions or bars having up-turned rear ends 10 provided at their upper extremities with collars or rings 11 adapted to encircle the axle. The frame bars extend forwardly from the up-turned ends 10 to points slightly in advance of the transverse plane of the most forward portions of the ground wheels whence they are deflected laterally so as to extend outwardly in advance of the wheels, as shown at 12 and from, the outer extremities of these laterally extending portions the bars converge forwardly, as shown at 13, and are then carried forwardly in parallel planes, as shown at 14. The converging portions 13 of the frame bars constitute fenders or deflectors whereby the vines or bushes will be turned aside and prevented from becoming entangled with the ground wheels or lodged between the same and the rear portions of the frame. The said rear portions of the frame bars are connected by a cross bar 15 and this cross bar 15 is provided with sleeves or bearings 16 near its ends in which are mounted vertically movable pins 17. These pins 17 are pivoted at their upper ends to the levers or treadles 18 and springs 19 are coiled around the rods between the frame bar and the treadles so that when the operator relieves a treadle of his weight the spring below that treadle will expand and return the treadle to its upper position. The rear portions of the treadles are forked or bifurcated, as shown at 20, and the said forked or bifurcated portions extend to the axle and terminate in eyes or rings 21 which encircle the central member of the axle. Between the members of each fork or bifurcation I secure to the central sleeve 1 of the axle a ratchet disk 22 and this ratchet disk is engaged by a dog 23 pivotally mounted within the fork or bifurcation of the adjacent treadle or lever. The upper ends of the dogs are turned forwardly and weighted, as shown at 24, whereby they overhang the treadles and swing the lower pointed ends of the dogs toward the ratchets so that they will be in constant engagement.

The parallel portions 14 of the frame bars are rigidly connected by suitable bolts indicated at 25, and between the forward extremities of the said parallel portions of the frame bars I secure a journal box 26 in which is fitted a pin or hanger 27. This pin or hanger is provided with a plurality of horizontal openings 28 through which a fastening pin may be inserted to secure the plow beam 29 at any desired height. The plow beam 29 is given an irregular form substantially S-shaped in plan view whereby it is provided with lateral extensions 30, and the rear end of the plow beam is turned downwardly to constitute a shank or standard 31 to which a shovel or other plow body 32 may be secured. Pivotally mounted between the forward portions of the frame bars is a lever 33 which is provided at its lower end with a fork or yoke 34 having antifriction rollers 35 mounted upon its side members. The branches of this fork or yoke fit over the plow beam and engage the opposite sides of the same, as will be readily understood on reference to Fig. 5. The lever 33 is provided with a latch or locking member 36 which engages a segment 37 secured upon the frame bars, as shown and as will be readily understood.

Rising from the frame bars and extending forwardly beyond the same is a beam 38 having an eye 39 at its front end in which is swiveled a caster or steering wheel 40, the stem or shank of the said steering wheel being continued upwardly above the beam 38 to form a steering bar 41 equipped at its upper end with a handle 42 disposed above the treadles 18 and in such relation to the treadles that it may be easily grasped by a person standing upon the treadles.

It is thought that the manner of using my improved plow may be readily understood from the foregoing description taken in connection with the accompanying drawings. The operator stands upon the treadles 18 and by shifting his weight from one to the other will cause them to alternately descend and the descent of the treadle will impart rotation to the adjacent ratchet wheel and as the ratchet wheels are fixed to the axle the axle and the ground wheels will be rotated so that the machine will be driven forward. One treadle, of course, is permitted to rise as the other treadle descends and they will operate alternately so that the machine will be propelled continuously and without interruption. The machine will be steered by swinging the steering bar 41 to one or the other side as may be necessary and the plow will be held to a straight furrow by manipulating the lever 33. If the said lever be swung forward the yoke at the lower end thereof will bear upon the forward projection 30 of the plow beam and will cause the beam to swing to the right, while if the lever be swung rearwardly the fork will bear upon the rear projection 30 and force the lever to the left. This operation will be readily understood from Fig. 5 of the drawings.

It will be readily noted that my improved plow is composed of very few parts which are simple in their construction and arrangement, and by the use of my plow the ground may be treated without the necessity of employing draft animals or without incurring the expense incident to the use of a mechanical motor. The pedals are preferably equipped with toe-clips or straps, indicated at 43, to prevent slipping of the operator's feet.

Having thus described my invention, what I claim is:

1. In a machine for the purpose set forth, the combination of a wheeled frame, a plow hung upon said frame and having its beam provided with lateral projections connected by an obliquely extending portion, and a fork pivoted upon the frame and engaging said obliquely extending portion of the plow beam.

2. In a machine for the purpose set forth, the combination of a wheeled axle, a frame consisting of bars hung upon and extending forwardly from said axle, said bars being bent laterally to project in advance of the wheels on the axle and then converging forwardly from the outer ends of the laterally bent portions, and a plow hung upon the front end of the frame.

In testimony whereof I affix my signature in presence of two witnesses.

JESSIE V. EDWARDS. [L. S.]

Witnesses:
 W. W. DODD,
 C. P. EIDSON.